(12) United States Patent
Odeskog et al.

(10) Patent No.: US 7,216,697 B2
(45) Date of Patent: May 15, 2007

(54) METHOD OF OPERATING A COOLING AND HEATING CIRCUIT OF A MOTOR VEHICLE

(75) Inventors: Jim Odeskog, Ludwigsburg (DE); Holger Huelser, Graz (AT); Isabelle Gentil-Kreienkamp, Grossbottwar (DE)

(73) Assignee: Robert Bosch GmbH, Stuttgart (DE)

( * ) Notice: Subject to any disclaimer, the term of this patent is extended or adjusted under 35 U.S.C. 154(b) by 70 days.

(21) Appl. No.: 10/627,214

(22) Filed: Jul. 25, 2003

(65) Prior Publication Data

US 2005/0126748 A1    Jun. 16, 2005

(30) Foreign Application Priority Data

Jul. 30, 2002    (DE) ................................ 102 34 608

(51) Int. Cl.
*B60H 1/00*    (2006.01)

(52) U.S. Cl. ...................... 165/202; 165/240; 165/299; 62/244; 62/196.1; 62/238.7

(58) Field of Classification Search ................ 165/202, 165/42, 43, 44, 51, 52, 299; 62/238.7, 244, 62/324.1, 196.1, 196.4
See application file for complete search history.

(56) References Cited

U.S. PATENT DOCUMENTS

| | | | |
|---|---|---|---|
| 5,299,630 A | | 4/1994 | Schatz |
| 5,558,055 A | | 9/1996 | Schatz |
| 5,765,511 A | | 6/1998 | Schatz |
| 6,477,990 B2 | | 11/2002 | Toyoshima et al. |
| 6,520,136 B2 | | 2/2003 | Ito et al. |
| 6,532,911 B2 | * | 3/2003 | Suzuki et al. ............. 123/41.14 |
| 6,679,321 B2 | * | 1/2004 | Jin ............................... 165/236 |
| 6,843,312 B2 | * | 1/2005 | Burk et al. .................. 165/299 |
| 6,910,341 B2 | * | 6/2005 | Srichai et al. .............. 62/196.4 |
| 2001/0013409 A1 | * | 8/2001 | Burk et al. .................. 165/240 |
| 2004/0055320 A1 | * | 3/2004 | Horstmann et al. ........... 62/244 |
| 2005/0204768 A1 | * | 9/2005 | Di Vito et al. .............. 62/324.1 |

FOREIGN PATENT DOCUMENTS

| | | |
|---|---|---|
| DE | 37 38 412 A1 | 5/1989 |
| DE | 42 14 850 A1 | 11/1993 |
| DE | 196 01 319 A1 | 7/1997 |
| DE | 198 45 398 C1 | 3/2000 |
| EP | 0 499 071 A1 | 8/1992 |
| EP | 1 172 538 | 1/2002 |

* cited by examiner

*Primary Examiner*—Ljiljana Ciric
(74) *Attorney, Agent, or Firm*—Michael J. Striker

(57) ABSTRACT

In a method for operating a cooling and heating circuit of a motor vehicle driven by an internal combustion engine, a first cooling medium path is provided through a bypass conduit, a second cooling medium path is provided through a main cooler of the internal combustion engine, a third cooling medium is provided through a heating heat exchanger, and a fourth cooling medium path is provided through a heat accumulator. The cooling medium flows through the paths are subdivided by an electrically operated valves, and the cooling medium flows are generated by at least one pump. The valves are controlled by a control unit based on operational and environmental parameters as well as nominal values, and a third control valve which is controlled by the control unit is arranged in the fourth cooling medium path. The circuit is operated so that the third control valve is closed completely or partially when a reference temperature of a remaining cooling and heating circuit exceeds a nominal value provided in the control unit, and the third control valve is opened when the reference temperature is below the nominal value.

6 Claims, 1 Drawing Sheet

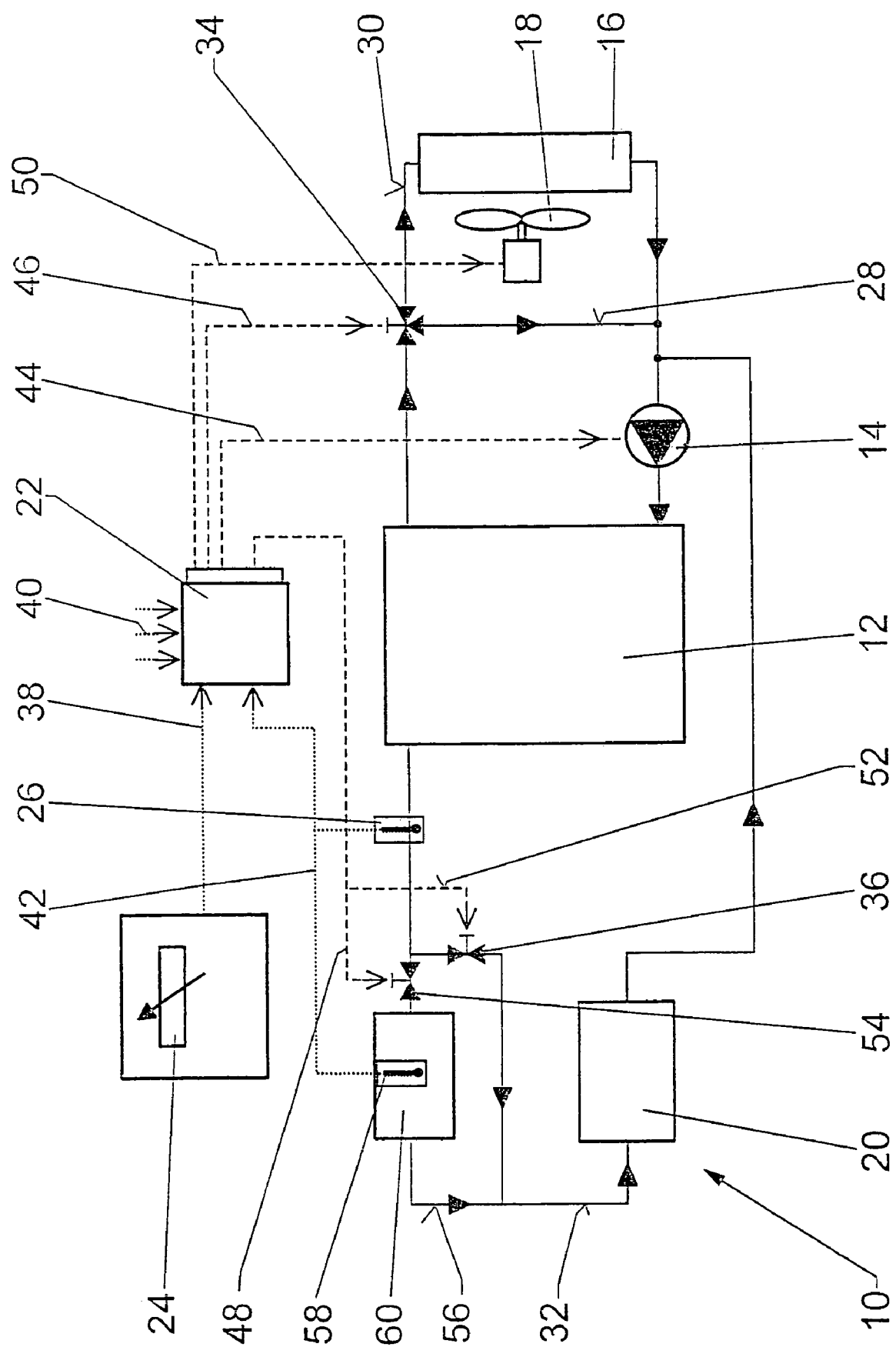

METHOD OF OPERATING A COOLING AND HEATING CIRCUIT OF A MOTOR VEHICLE

BACKGROUND OF THE INVENTION

The present invention relates to a method of operating a cooling and heating circuit of a motor vehicle.

Known cooling and heating devices of motor vehicles with an internal combustion engine include as a rule a cooling and heating circuit with several cooling medium paths, for distribution and withdrawal when needed of heat which is generated in the internal combustion engine, and additional aggregates, for example turbochargers, transmissions, and generators, in the sense of a thermal management. Operational and environmental parameters, such as for example the temperatures and/or the pressure conditions of the media, the rotary speed, the load and the temperature of the internal combustion engine, the components and aggregates, as well as the temperature of the surrounding air and the passenger space, are detected in an electronic control unit as input signals and processed to provide output signals. The output signals are used for controlling of the majority of the electrically operated feeding and adjusting devices.

Such a cooling device is disclosed for example in the European patent document EP 0 499 071 A1. It includes a cooling medium circuit for cooling the internal combustion engine. Furthermore, the machine oil and the load air are cooled with air by additional oil cooler and charge air cooler with air. A control device which has as least one microprocessor determines, depending on a plurality of measured status variables, the cooling power demand or heat demand of each individual aggregate or component of the cooling system and regulates the cooling medium flows individually, but with consideration of the requirements of the total system.

For controlling the material and heat flows, electrically controlled pumps and valves are provided. Furthermore, additional regulatable heating devices are connected to the cooling device, for example for warming up of the vehicle space or the wiping water of windshield wiper device, so that excessive heat energy can be used for heating when needed.

The cooling medium circuit for cooling of the internal combustion engine shown in FIG. 6 of the European patent document EP 0 499 071 A1 has a first cooling medium path through a bypass conduit, a second cooling medium path through a main cooler of the internal combustion engine, a third cooling medium path through a heating heat exchanger and a fourth cooling medium path through a heat accumulator.

During a cold start the cooling medium flows so as to bypass the main cooler and through the bypass conduit both to the internal combustion engine back, and supplies it in a lower region, namely in the region of the cylinder block. This small circuit provides low cooling power, so that the internal combustion engine can reach fast its operational temperature and the fuel consumption is advantageously reduce. When the cooling medium temperature increases, a valve opens the second cooling medium path to the main cooler, which when needed cooperates with a shutter and a blower and draws the excessive heat of the cooling medium. In a third cooling medium path a heating heat exchanger is arranged, through which a part of the cooling medium flow is supplied when needed, to heat the passenger space.

When the cooling power of the heating heat exchanger is sufficient, the cooling medium path with the main cooler can be completely blocked. The excessive heat is supplied in this operational condition exclusively in the passenger space, which at low outside temperatures improves the comfort. During the warming up phase of the internal combustion engine as a rule the heat produced during combustion is used for reaching the operational temperature of the internal combustion engine fast, to lower the fuel consumption and to reduce the emission of damaging substances. The cooling medium which flows through the heating heat exchanger is significantly reduced or completely blocked, so that during this period costs of the comfort involve only a small or no energy for heating of the passenger space.

The heat accumulator which can be formed as a latent heat accumulator can store waste heat generated by the fuel combustion in a normal operation, and gives out the stored heat when necessary for warming up the internal combustion engine, in particular with low environmental temperatures for fast warming up and can also heat the passenger space. It is provided with valve means and controlled by the control unit so that it can be operated in series with the heating heat exchanger or parallel to it and can supply the heat when needed to the cooling medium or withdraw the excessive heat.

A cooling and heating circuit with a latten heat accumulator is also disclosed in the German patent document DE 196 01 319 A1. The cooling medium flow through the heat accumulator is also regulated by a control unit which evaluates signals of temperature sensors arranged on the internal combustion engine and on the heat accumulator and detects the temperature of the cooling medium as well as of special components. In addition to the desired heat introduction in the starting phase of the internal combustion engine, the heat accumulator improves the efficiency of the internal combustion engine in a partial load region, when the temperature of the cooling medium increases above the mainly used value 95° to a value 105° C. For avoiding an overheating of the internal combustion engine, the temperature of the cooling medium can be however lowered again in full load operation. Known heat accumulators due to their thermal inertia, significantly slow this process, which can lead to damages of components of the internal combustion engine. In order to achieve a fast change of the cooling temperature, special devices are needed in the cooling circuit.

German patent document DE 37 38 412 A1 further discloses a device and a method for regulation of the temperature of an internal combustion engine. The cooling medium circulates in a cooling circuit which is composed of several cooling medium paths. A first cooling medium path leads to a bypass conduit, a second cooling medium path leads to a main cooler of the internal combustion engine, and a third cooling medium path leads to a heating heat exchanger which serves for climatization of a passenger space. The cooling medium distribution is performed by electrically actuated valves at the branches of the cooling medium path. In addition, a mechanically or electrically driven pump is arranged in the cooling circuit. For controlling the valves and the electrical pump, a control unit is provided which supplies operational and environmental parameters of the internal combustion engine as input signals, such as for example the rotary speed and the temperature of the internal combustion engine, the pressure and the temperature of the cooling medium, and also the temperature of the environmental air and the passenger space. The control unit processes these informations to provide output signals which form adjusting variables for the control valves and the electric pump.

SUMMARY OF THE INVENTION

Accordingly, it is an object of the present invention to provide a method of operating a cooling and heating circuit of a motor vehicle.

In keeping with these objects and with others which will become apparent hereinafter, one feature of the present invention resides, briefly stated, in a method for operating a cooling and heating circuit of a motor vehicle driven by an internal combustion engine, the method comprising the steps providing a first cooling medium path through a bypass conduit; providing a second cooling medium path through a main cooler of the internal combustion engine; providing a third cooling medium through a heating heat exchanger; providing a fourth cooling medium path through a heat accumulator; subdividing cooling medium flows through said paths by an electrically operated valves; providing the cooling medium flows by at least one pump; controlling said valves by a control unit in dependence on operational and environmental parameters as well as nominal values; arranging a third control valve which is controlled by said control unit in said fourth cooling medium path and closing the third control valve completely or partially when a reference temperature of a remaining cooling and heating circuit exceeds a nominal value provided in said control unit, and opening said third control valve when the reference temperature is below the nominal value.

In accordance with the present invention, the third control valve which is controlled by the control unit is arranged in the fourth cooling medium path, and it is completely or partially closed when a reference temperature of the remaining cooling and heating circuit exceeds a nominal value provided in the control unit, and opens when the reference temperature is lower than the nominal value.

The cooling medium flows in the fourth cooling medium path from the internal combustion engine through the heat accumulator, preferably a latent heat accumulator with a large heat capacity, and subsequently flows through the heating heat exchanger back to the internal combustion engine. When the temperature of the medium in the heat accumulator is greater than that of the cooling medium, heat is transmitted to the through flowing cooling medium, and the heat accumulator is unloaded. The heat energy in this case serves for example for heating of the passenger space and for warming up the internal combustion engine until reaching the operational temperature. In normal operation of the internal combustion engine, the temperature of the cooling medium as a rule is greater than of the accumulator medium, so that the through flowing cooling medium gives up heat and the heat accumulator is charged.

During loading and unloading of the heat accumulator the heat quantity to be transmitted is regulated in accordance with the demand, by the control valve in the supply inlet of the heat accumulator which adjusts the required cooling medium flow. As adjusting variables, the cooling valve obtains a signal from a control unit, which in addition to other operational and environmental parameters, evaluates the temperature of the cooling medium detecting by a temperature sensor. In the inventive method the provision is made that the computer program in the control unit determines a reference temperature drawn with respect to the measuring position of the temperature sensor, which is compared with a delivered nominal value. The reference temperature is determined by addition or subtraction of a constant value, by means of a characteristic line, or by a model of the cooling system and its relevant temperatures in the control unit. The result of the comparison forms the adjusting variables for the control valve. Based on this provision the control unit is in the position to change fast the temperature of the cooling medium to sensibly adjust the cooling and heating circuit of the internal combustion engine. Advantageously in the full operational region the overheating of critical components of the internal combustion engine or the machine oil is prevented and with partial load or during starts, internal combustion engine reaches its optimal operational temperature in a very short time.

When the heat accumulator is unloaded significantly or completely the temperature of the heat accumulator significantly deviates from the reference temperature. In an embodiment of the invention, the temperature of the heat accumulator can be calculated by means of a model. The model is composed of algorithms which use the detected parameter, such as for example the environmental temperature or the time of running of the internal combustion engine, to determine the temperature of the heat accumulator.

The control unit then opens the control valve when the temperature in the heat accumulator is greater than the reference temperature and the reference temperature is smaller than the nominal value of the reference temperature or the reference temperature is greater/equal to the nominal value of the reference temperature and the temperature in the heat accumulator is smaller than the nominal value of the reference temperature. It closes when the temperature of the heat accumulator is smaller/equal to the reference temperature or the reference temperature is greater/equal to the nominal value of the reference temperature and the reference temperature is smaller than the nominal value of the reference temperature or the temperature in the heat accumulator is greater/equal than the nominal value of the reference temperature.

The advantage of this embodiment when compared with the first embodiment is that, during start of the internal combustion engine with the unloaded heat accumulator the control valve is closed when the temperature and the heat accumulator is smaller/equal to the reference temperature as long as the reference temperature is smaller than the nominal value of the reference temperature. This means that, when in the starting phase the heat energy in the heat accumulator is still available, it is utilized and the heat accumulator is unloaded.

When the temperature of the cooling medium is greater than the temperature of the heat accumulator, the control valve is closed so that the waste heat generated during the fuel consumption is completely used for heating of the internal combustion engine and the occupant space. The heat accumulator is loaded first when the internal combustion engine reaches its operational temperature. In this case, the control valve is open and is again closed when the accumulator can not take any heat.

In accordance with a further embodiment of the present invention, a temperature sensor is provided which detects the temperature of the heat accumulator directly and sends a signal to the control unit. The signal is processed in accordance with the algorithm of the previously described design, so that the detected temperature has a greater accuracy, which justifies the use of an additional temperature sensor.

In all embodiments of the invention, the nominal value for the closing of the control valve is preferably greater than the nominal value for the opening, so that between the opening and the closing of the control valve a hysteresis is provided, for avoiding unstable switching conditions at low differences of the temperature signal. Furthermore, it is advantageous when a control device of the internal combustion engine is used as a control unit.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single FIGURE of the drawings is a view schematically showing a cooling and heating circuit of a motor vehicle for performing the method in accordance with the present invention.

DESCRIPTION OF THE PREFERRED EMBODIMENTS

An internal combustion engine 12 is connected with a cooling and heating circuit 10, in which a pump 14 feeds a cooling medium. The pump 14 can be a pump which is driven by a regulatable electric motor or a pump which is driven mechanically from the internal combustion engine 12. When needed it has a device for adjustment of the heating quantity. It feeds the cooling medium from the internal combustion engine 12 through a first cooling medium path 28, a bypass conduit, directly back to the internal combustion engine 12. Over the cooling medium path 12 the cooling medium draws a very little heat so that the internal combustion engine 12 can reach fast an optimal operational temperature and with low emission of damaging substances consumes less fuel.

A second cooling medium path 30 to a main cooler 16 is provided parallel to the bypass conduit 28. It cooperates with a fan 18 and draws excessive heat from the cooling medium. A first control valve 34 is arranged at the branching of the second cooling medium path 30 and distributes a cooling medium flow from the cooler 16 and/or the bypass conduit 28. The control valve 30 can be formed as a 3-way valve or as two 2-way valves. An electrically operating proportional valve can be used as such a valve.

The cooling medium flows from the internal combustion engine 12 to a heating heat exchanger 20 over a third cooling medium path 32 and then back to the internal combustion engine 12. The heating heat exchanger 20 serves for withdrawing heat from the cooling medium into a passenger space of the motor vehicle. The cooling mediums flow can be definitely reduced through the heating heat exchanger 20 by a second control valve 36 provided in the cooling medium path 32. A fourth cooling medium path 56 with a heat accumulator 60 branches from the third cooling medium path 32. The heat accumulator 60 is formed for example as a latent heat accumulator which by phase conversion of an accumulated medium, for example crystallization, accumulates large heat quantity over several days, and when needed gives up heat to the cooling medium with high power, for example 100 Wh/min. The cooling medium flow in the fourth cooling medium path 56 is adjusted by a third control valve 54.

The cooling medium flows can be regulated by a control unit 22. The control unit 22 receives data through direct signal conductors or through a data box, for example CAN (Control Area Network) and processes them into signals for the adjusting devices of the cooling medium circuit, which can be in form of a PWM signals or can be sent through the CAN bus. As input signals 40, operational and environmental parameters of the internal combustion engine can be supplied to the control unit 22, such as for example the rotary speed and the temperature of the internal combustion engine 12, the speed of the vehicle, as well as the temperature of the surrounding air and the passenger space. The temperature of the cooling medium is detected by a temperature sensor 26 which is arranged in the cooling medium circuit at the output of the internal combustion engine 12. It is transferred in form of an input signal 42 also to the control unit 22. Furthermore, a nominal value signal 38 is introduced in the control program of the control unit 22, for example the desire for a heat introduction in the occupants space which is adjusted on a service device 24 of a heating 20 or a climate device by a driver.

After evaluation of the nominal value signal 38 and/or the input signals 40, 42 the control unit 22 sends an output signal 44 to a control device of the pump 14. Thereby its feeding power and thereby the magnitude of the cooling medium volume flow is determined in the cooling and heating circuit 10 and an output signal 50 is supplied to the fan 18 which determines its power and the heat withdrawal through the main cooler 16 is improved, when the temperature of the cooling medium is very high. The output signals 46 and 52 control the position of the control valve 34, 36 and determine the distribution of the cooling medium flows over the corresponding cooling medium paths 28, 30, 32. The output signal 48 determines the position of the control valve 54 and thereby the cooling medium flows through the heat accumulator 60. The control valve 54 in accordance with the present invention is therefore closed completely or partially, when a reference temperature of the remaining cooling and heating circuit 10 exceeds a nominal value provided in the control unit 22, and opens when the reference temperature is below the nominal value. The reference temperature is in accordance with the input signals 42 and with respect to the measuring position of the temperature sensor 26 by addition or subtraction of a constant value, by means of a characteristic line, or by a model of the cooling system 10 and its relevant temperatures in the control unit 22. With the inventive method the temperature of the cooling medium change advantageously in a very short time, and the cooling and heating circuit 10 of the internal combustion engine is adjusted when needed and sensibly.

In accordance with one embodiment of the present invention, in the control unit 22 in addition the temperature of the heat accumulator 60 is calculated by a model which is composed of algorithms, which use the input signal 38, 40, 42. The calculated value is compared with the reference temperature of the cooling medium, and the result forms the adjusting variables of the control valve 54. The control valve 54 is then adjusted so that the heat accumulator 60 gives up the heat energy only when it is needed. When the temperature in the heat accumulator 60 is greater than a desired cooling medium temperature, the flow of the cooling medium through the heat accumulator 60 is interrupted and the undesirable heat introduction is prevented. In addition to the discharge, the control valve 54 also is opened for charging the heat accumulator 60, and the through flowing cooling medium gives up heat energy to the heat accumulator 60. The heat accumulator 60 is loaded when the internal combustion engine 12 reaches its operational temperature.

A further embodiment of the invention provides an additional temperature sensor 58, which detects the temperature of the heat accumulator 60 directly and sends an input signal 42 to the control unit 22.

It will be understood that each of the elements described above, or two or more together, may also find a useful application in other types of methods differing from the types described above.

While the invention has been illustrated and described as embodied in method of operating a cooling and heating circuit of a motor vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

The invention claimed is:

1. A method for operating a cooling and heating circuit of a motor vehicle driven by an internal combustion engine, the method comprising the steps of providing a first cooling medium path through a bypass conduit; providing a second cooling medium path through a main cooler of the internal combustion engine; providing a third cooling medium through a heating heat exchanger; providing a fourth cooling medium path through a heat accumulator; subdividing cooling medium flows through said paths by electrically operated valves; providing the cooling medium flows by at least one pump; controlling said valves by a control unit based on operational and environmental parameters as well as nominal values; arranging a third control valve which is controlled by said control unit in said fourth cooling medium path and closing the third control valve completely or partially when a reference temperature of a remaining cooling and heating circuit exceeds a nominal value provided in said control unit, and opening said third control valve when the reference temperature is below the nominal value.

2. A method as defined in claim 1; and further comprising selecting a nominal value for the closing of the third control valve to be greater than a nominal value for the opening of the third control valve.

3. A method as defined in claim 1; and further comprising providing a temperature sensor in the heat accumulator; and opening the third control valve when a temperature of the heat accumulator is greater than a reference temperature and the reference temperature is smaller than a nominal value of the reference temperature, or the reference temperature is greater or equal to the nominal value of the reference temperature and the temperature in the heat accumulator is smaller than the nominal value of the reference temperature; and closing the third control valve when the temperature in the heat accumulator is smaller or equal to the reference temperature or the reference temperature is greater or equal to the nominal value of the reference temperature and the reference temperature is smaller than the nominal value of the reference temperature or the temperature in the heat accumulator is greater or equal to the nominal value of the reference temperature.

4. A method as defined in claim 1; and further comprising providing a hysteresis between the opening and the closing of the third control valve.

5. A method as defined in claim 1; and further comprising measuring the temperature of the heat accumulator directly by a temperature sensor.

6. A method as defined in claim 1; and further comprising using as the control unit a control device of the internal combustion engine.

* * * * *